No. 747,297. PATENTED DEC. 15, 1903.
W. H. & E. H. BRISTOL.
THERMOSTATIC APPARATUS.
APPLICATION FILED MAY 5, 1903.
NO MODEL. 2 SHEETS—SHEET 1.
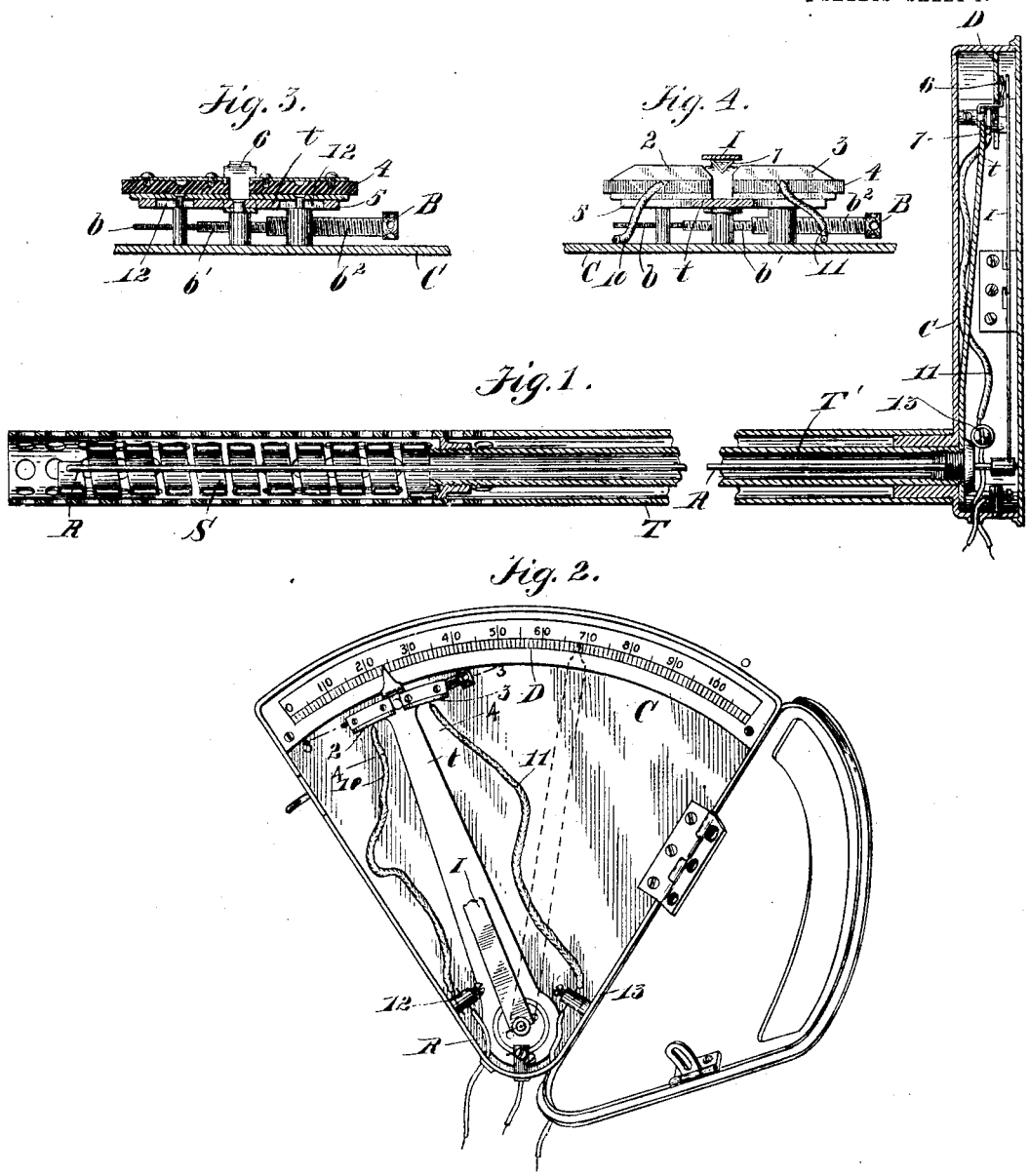
WITNESSES:
Frank W. Kearsley
Raena N. Yudizky
INVENTORS:
William H. Bristol,
Edgar H. Bristol,
BY
A. Vanderbush,
ATTORNEY.
THE NORRIS PETERS CO., PHOTO-LITHO., WASHINGTON, D. C.

No. 747,297. PATENTED DEC. 15, 1903.
W. H. & E. H. BRISTOL.
THERMOSTATIC APPARATUS.
APPLICATION FILED MAY 5, 1903.
NO MODEL. 2 SHEETS—SHEET 2.

WITNESSES:
Frank W. Kearsley.
Raena H. Yudizky.

INVENTORS:
William H. Bristol,
Edgar H. Bristol,
BY
ATTORNEY.

No. 747,297. Patented December 15, 1903.

UNITED STATES PATENT OFFICE.

WILLIAM H. BRISTOL, OF HOBOKEN, NEW JERSEY, AND EDGAR H. BRISTOL, OF NAUGATUCK, CONNECTICUT, ASSIGNORS TO THE BRISTOL COMPANY, OF WATERBURY, CONNECTICUT, A CORPORATION OF CONNECTICUT.

THERMOSTATIC APPARATUS.

SPECIFICATION forming part of Letters Patent No. 747,297, dated December 15, 1903.

Application filed May 5, 1903. Serial No. 155,787. (No model.)

*To all whom it may concern:*

Be it known that we, WILLIAM H. BRISTOL, residing at Hoboken, Hudson county, New Jersey, and EDGAR H. BRISTOL, residing at Naugatuck, in the county of New Haven and State of Connecticut, both citizens of the United States of America, have invented certain new and useful Improvements in Thermostatic Apparatus, of which the following is a specification.

Our invention has reference to an apparatus comprising both a thermostatic and a temperature-indicating device coöperating for the purpose of closing a circuit or circuits leading to the controlling mechanism for the refrigerating or heating apparatus, although the indicating device may operate independently of the thermostatic device as a simple thermometer. The temperature-indicating device therefore acts as a common thermometer in combination with a properly-graduated scale, and consequently shows at a glance whether or not the desired temperature is being maintained.

The temperature-indicating device while coöperating with the thermostatic part under normal conditions is, however, independent of the same in its movement under the influence of the existing temperature and may entirely leave the thermostatic part in case the heat or refrigerating apparatus is not properly controlled by the governing device.

The nature of our invention will best be understood when described in connection with the accompanying drawings, in which—

Figure 5:
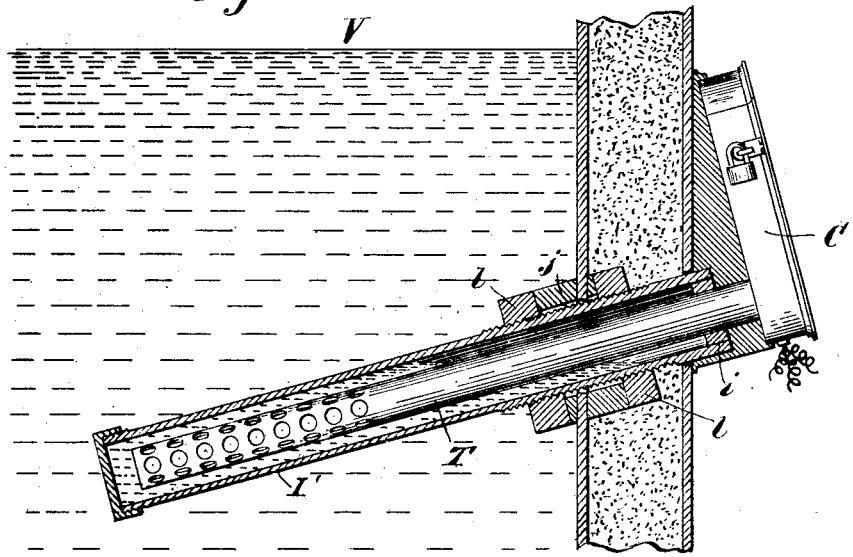
Figure 6:
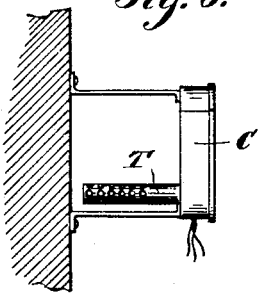

Figure 1 represents a longitudinal vertical section through the thermostat and illustrating a form especially adapted for brine tanks or vats such as commonly used in re-refrigerating apparatus or plants. Fig. 2 is a front elevation showing the cover of the thermostat opened. Fig. 3 is a section on the line 3 3, Fig. 2, drawn on an enlarged scale. Fig. 4 is a section on the line 4 4, Fig. 2, also on an enlarged scale. Fig. 5 is a sectional elevation, part broken away, showing the thermostat applied to a brine tank or vat. Fig. 6 is a side elevation showing the thermostat constructed for ordinary use—as, for instance, in a dry room or the like.

Similar letters and numerals of reference designate corresponding parts throughout the several views of the drawings.

Referring now to Figs. 1 to 6 of the drawings, wherein we have shown a thermostat particularly adapted for the purpose of regulating the temperature of brine tanks or vats of refrigerating apparatus, the letter I designates an indicating-hand arranged opposite a suitable dial or scale D, from which the degree of temperature can be read off. This indicating-hand may be operated by any suitable means influenced by changes in temperature, so as to induce movement of said hand relative to the dial or scale. In practice we, however, prefer to make use of the construction illustrated in our prior Patent, No. 514,256, of February 6, 1894, which is in this instance applied as follows: A helical spring S, formed of a tube of flattened cross-section, is placed within a tube T, having adjacent to the spring perforations for the admission of fluid or gas thereto and preferably also having its outer end open for the same purpose. The tube T is fastened by a usual internal thread to a hub extending from the dial-case C, and within the same is located a second tube T', extending partially the length of the tube T and having attached at its outer end the inner end of the spring S, while its inner end is secured to the hub of the dial-case. The outer end or last coil of the spring S is connected to the outwardly-bent end of a rod R, extending through the inner tube T' and upon which said rod is rigidly mounted the indicating-hand I, before referred to. It is evident that changes in temperature will cause the spring S to wind up or unwind, and consequently the hand will move over the dial in accordance to such changes without the use of multiplying devices. The helical spring-tube S is filled with a liquid or alcohol.

From the foregoing description it will be readily understood that this hand I and the spring S and connecting part form a thermometer from which the temperature can be read on the dial D.

To form a thermostat, it is necessary to provide a circuit-closing device which can be set so as to maintain in connection with the hand certain definite desired temperatures. In the present example we have shown a circuit-closer $t$, preferably mounted to turn about the same center as the indicating-hand I and consisting of an arm $t$, provided with two contacts 2 3, mounted upon an insulating-plate 4, attached to a head 5 on the arm $t$, and said plates being spaced apart. The thermostatic arm is provided with a pointer 6, arranged opposite the same dial as the indicating-hand, so that one scale will answer for both parts. The side of the indicating-hand I adjacent or facing the contacts 2 3 is provided with a contact 7, adapted to engage with either of the contacts 2 and 3, according to the direction of movement of said indicating-hand under the influence of changes in temperature. The contact 7 on the temperature-indicating hand is made wedge-shaped, and the adjacent ends of the contacts 2 and 3 are correspondingly beveled, as best seen in Fig. 4, so that the indicating-hand can ride over the contacts 2 and 3 and pass the same in either direction. The indicating-hand will therefore continue to indicate the existing temperature when the controlling apparatus fails to perform its functions, and so acts as a telltale. The contacts 2 and 3 are connected, respectively, by wires 10 and 11 with suitable binding-posts 12 and 13, preferably located within the casing and from which the wires are led to the electric regulating mechanism for the engine-valve, so as to either start or stop, increase, or decrease the effectiveness of the refrigerating or heat-producing apparatus, according to the contact which the indicating-hand makes. Mechanisms of this kind are old and well known, and we have therefore not shown or described the same in detail, as they form no part of our present invention.

In order to adjust the interval between the contacts 2 and 3 and for the purpose of facilitating the assembling of the parts, we make use of a single compound screw B, comprising three threaded sections arranged in line, but of different diameters. Through-section $b$, which is the smallest in diameter, engages with a lug pendent from the contact 2, section $b'$, somewhat larger in diameter, engages with a stationary post on the head of the thermostat-arm, and section $b^2$ engages with a lug pendent from the contact 3. The contacts are guided in suitable slots 12 and reduced portions of the pendent lugs, as best seen in Figs. 3 and 4. It is evident that if the screw B is turned in one direction the contacts will be caused to separate, while if turned in the opposite direction the contacts will approach each other. By adjusting the distance between the contacts 2 and 3 the temperature can be controlled within any number of degrees desired.

The pitches of the different threads of the screw are made to produce equal rate of approach and separation of the contact-plates. In practice we use screw-threads, as follows: twenty-four, thirty-six, and seventy-two per inch.

In Fig. 5 we have shown the thermometer-thermostat applied to a brine-vat V. In such application I inclose the tube T in an inclosing tubular case I' for the purpose of preventing contact of the brine with the operating parts, as the action of the former would be deleterious. This inclosing casing may consist of an ordinary wrought-iron tubing capped at its inner end and closed at its outer by a suitable plug $i$. The intervening space may be filled with glycerin or other suitable liquid for the purpose of providing a liquid conductor between the brine and the liquid in the operative spring. To prevent the fluid within the tube T from entering the case C, the instrument is preferably set at an inclination, as shown in Fig. 5, and the tube I' is secured water-tight by means of the tapered bushings $j$ and nuts 1, screwed on the inclosing tube I' and wedging the said blocks against the inner wall of the brine-vat.

Of course it is to be understood that the instrument herein described has a wide range in the application and can be used in dwellings for regulating the temperature of individual rooms, or it can be adapted to drying-rooms and for other purposes where thermostats of the ordinary construction are available. In Fig. 6 we have shown the instrument adapted in construction for drying-rooms or dwelling-rooms, the construction being the same as before, excepting that the tube T is shortened.

We do not wish to restrict ourselves to any particular means for actuating the indicating-hands under the influence of variations of temperature, as any usual means for this purpose can be employed, our invention consisting, essentially, in an independent hand controlled by existing temperatures and a movable thermostatic device provided with contacts and electrical connections and said hand coöperating with said thermostatic device to make and break circuits through the former.

What we claim as new is—

1. In a temperature-regulating apparatus, the combination of a scale, an adjustable thermostatic arm pointing to said scale, and provided with spaced contacts, and a temperature-indicating hand pointing to the scale and arranged to pass between and laterally movable beyond the contacts in either direction, substantially as described.

2. In a temperature-regulating apparatus, the combination of a scale, an adjustable thermostatic arm pointing to said scale and provided with two contacts, means for simultaneously adjusting the contacts toward and from each other by equal increments, and a temperature-indicating hand pointing to the same scale and arranged to pass between and laterally movable beyond the contacts in either direction, substantially as described.

3. In a temperature-regulating apparatus, the combination of a scale, a thermostatic arm pointing to said scale and provided with spaced contacts, and a temperature-indicating hand turning about an axis coincident with that of the thermostatic arm and pointing to the same scale and adapted to engage with either of the contacts, substantially as described.

In testimony whereof we have hereunto set our hands in the presence of two subscribing witnesses.

WILLIAM H. BRISTOL.
EDGAR H. BRISTOL.

Witnesses:
GEO. H. BARNES,
JESSE B. KELSEY.